United States Patent [19]

Kubo et al.

[11] Patent Number: 4,783,960

[45] Date of Patent: Nov. 15, 1988

[54] FLUID TORQUE CONVERTER WITH AXIALLY CUT AWAY STATOR INNER SHELL

[75] Inventors: Seitoku Kubo, Toyota; Koujiro Kuramochi, Okazaki; Tokuyuki Takahashi, Toyota, all of Japan

[73] Assignee: Toyota Jidosha Kabushiki Kaisha, Japan

[21] Appl. No.: 292,176

[22] Filed: Aug. 12, 1981

[30] Foreign Application Priority Data

Aug. 18, 1980 [JP] Japan ................... 55-113305

[51] Int. Cl.$^4$ ............................................. F16D 33/00
[52] U.S. Cl. ........................................ 60/338; 60/361; 415/62
[58] Field of Search ............... 60/330, 338, 361, 362, 60/364, 365, 366, 367; 415/62, 209, 210

[56] References Cited

U.S. PATENT DOCUMENTS

| | | | |
|---|---|---|---|
| 2,306,758 | 12/1942 | Schneider et al. | 60/361 |
| 2,755,628 | 7/1956 | Mamo | 415/62 |
| 3,184,833 | 5/1965 | Zeidler et al. | 60/338 |
| 4,044,556 | 8/1977 | Kuramochi et al. | 60/361 |
| 4,186,557 | 2/1980 | Arai et al. | 60/361 |

Primary Examiner—Charles T. Jordan
Assistant Examiner—Richard L. Klein
Attorney, Agent, or Firm—Stevens, Davis, Miller & Mosher

[57] ABSTRACT

A torque converter includes a coaxially mounted pump impeller, turbine, and stator, each of which includes an outer shell, an inner shell, and vanes extending between the outer shell and the inner shell having edges which define an inlet and outlet. The pump impeller outlet is proximate to the turbine inlet, the turbine outlet is proximate to the stator inlet, and the stator outlet is proximate to the pump impeller inlet. The outer and inner shells cooperate to define outer and inner toroidal surfaces, which together define a hollow toroidal hydraulic fluid circulation path. The ratio between the axial extent and the radical extent of a section of the outer toroidal surface is less than approximately 0.9. The axial distance between the general axial position of the edges of the stator vanes which define the stator inlet and the axial position of the edge of the stator inner shell in the direction of the stator inlet is substantially greater than zero, and the stator vanes which define the stator inlet extend more towards the direction of the turbine outlet than does the edge of the stator inner shell in the direction of the stator inlet.

1 Claim, 1 Drawing Sheet

FLUID TORQUE CONVERTER WITH AXIALLY CUT AWAY STATOR INNER SHELL

BACKGROUND OF THE INVENTION

The present invention relates to a fluid torque converter, and more particularly relates to an improvement in the construction of a fluid torque converter of the general type disclosed in Japanese Patent Applications Nos. 50-157478 and 53-61266, to which U.S. Pats. Nos. 4,044,556 and 4,186,557 correspond, respectively.

An automatic transmission for an automotive vehicle conventionally includes a fluid torque converter, which provides a fluid coupling between the internal combustion engine of the vehicle and the gear transmission mechanism thereof, thus eliminating the need for any clutch system for the drive train of the vehicle, and allowing for the vehicle to be stationary while the internal combustion engine is turning at a low rotational speed at or close to the idling speed without the engine stalling, as well as providing torque multiplication by fluid flow in a per se well known way when the vehicle is being accelerated at relatively low speed and relatively low engine rotational speed. Many such torque converters are of course presently well known. Generally, such a torque converter comprises: a housing or outer shell of a generally toroidal shape, on the inside of which there are formed a series of vanes which constitute a pump impeller, and on the inside of which vanes there is fixed a pump impeller inner shell, said pump impeller being rotationally fixed to a power input shaft; a turbine member mounted within the housing as rotationally fixed to a power output shaft, formed with an outer shell on the inside of which there are formed a series of vanes, on the inside of which vanes there is fixed a turbine member inner shell; and a stator member formed with an outer shell on the inside of which there are formed a series of vanes, on the inside of which vanes there is fixed a stator member inner shell, said stator member being mounted within the housing via a one way brake on a fixed member. Thus, in such a torque converter, each of the pump impeller, the turbine member, and the stator member is formed with an inlet and an outlet, defined by the edges of its vanes which extend between its outer shell and its inner shell. The housing of such a torque converter is kept filled with hydraulic fluid, which is pumped thereinto and is also drained therefrom, and in a per se well known way the pump impeller, the stator member, and the turbine member cooperate, when the housing of the torque converter is thus filled with hydraulic fluid, to define a toroidal hydraulic fluid flow circulation system, circulation of hydraulic fluid around which in the general circulation fashion of a smoke ring is arranged to transfer torque in a conventional manner between the pump impeller and the turbine member of the torque converter. In such a hydraulic fluid flow circulation system, the hydraulic fluid passes out from the outlet of the pump impeller into the inlet of the turbine member which is closely justaposed thereto, passes through the turbine member and out of its outlet into the inlet of the stator member which is closely juxtaposed thereto, and passes through the stator member to pass out of its outlet into the inlet of the pump impeller which is closely juxtaposed thereto, to be again recirculated.

Conventionally, the cross sectional shape of a section of the outer toroidal surfaces of such a torque converter, as taken in a plane including the central axis thereof, has been approximately circular. However, in view of the great desirability of minimizing the axial length of a torque converter of an automatic transmission, in order to minimize the total axial length of the transmission - which is an important design goal in the design of automatic transmissions for front engined front wheel drive automobiles or so called FF automobiles which are becoming more and more popular nowadays - it has been proposed, in the aforementioned Patents which were filed by the same assignee as the present application, to flatten such a torque converter in its axial direction, so that such a circular cross sectional shape becomes substantially an elliptical shape, whose major axis extends in the radial direction of the torque converter, perpendicular to the central axis thereof. A fuller description of the limitations on the dimensions and construction of such a torque converter, specified in the abovementioned Patents, will be given later in the section of this specification entitled

DESCRIPTION OF THE PREFERRED EMBODIMENT

However, the construction as specified in this prior art had a drawback, which will now be explained. The flow of hydraulic fluid from out of the outlet of the turbine member into the inlet of the stator member has tended to impinge against the edge of the inner shell of the stator member towards the outlet of the turbine member; and this impingement has tended to cause turbulence in the flow of hydraulic fluid around the above described hollow toroidal hydraulic fluid flow path within the torque converter. This problem is much more pronounced in the case of torque converters constucted according to the constructional principles of the above mentioned Patents than in the case of conventional prior art torque converters of substantially circular cross section of the sort detailed above, to a degree that provides serious inconvenience, because of the elliptical form of the cross section of such torque converters according to such an axially compressed construction; and further this problem is even worse when the stator member is formed as an axially drawn type stator wheel which is produced by drawing two molds apart from one another along the axial direction of the stator member, which is a very convenient and economical way of forming such a stator member. On the other hand, if the stator member should be formed as of an axially shorter dimension than otherwise desired, in order to obviate this problem of turbulence, then such a stator member would have vanes which would be too thin, i.e. of too small extent in the axial direction, to perform their needed function of momentum conversion of the hydraulic fluid passing through the stator member.

SUMMARY OF THE INVENTION

Accordingly, it is the primary object of the present invention to provide a fluid torque converter which is axially compressed, in the manner explained above, and which avoids the above mentioned problems.

It is a further object of the present invention to provide an axially compressed fluid torque converter, in which the flow of hydraulic fluid from out of the outlet of the turbine member into the inlet of the stator member does not tend to impinge against the edge of the inner shell of the stator member towards the outlet of the turbine member.

It is a further object of the present invention to provide an axially compressed fluid torque converter, in which turbulence of the hydraulic fluid circulating within the interior of the torque converter is minimized.

It is a further object of the present invention to provide an axially compressed fluid torque converter, in which it is practicable to form the stator member as an axially drawn type stator wheel which is produced by drawing two molds apart from one another along the axial direction of the stator member.

It is a yet further object of the present invention to provide an axially compressed fluid torque converter, in which the function of the stator member for momentum conversion is suitably available.

It is a yet further object of the present invention to provide an axially compressed fluid torque converter, in which the inner toroidal surface of the hollow toroidal flow path of the hydraulic fluid within the torque converter is properly defined by the cooperation of the inner shells of the pump impeller, the turbine member, and the stator member.

It is a yet further object of the present invention to provide an axially compressed fluid torque converter, in which in particular that part of the hydraulic fluid circulating within the torque converter which is moving close to the inner shells of the pump impeller, the turbine member, and the stator member is enabled to circulate smoothly without undue turbulence.

According to the present invention, these and other objects are accomplished by a fluid torque converter, comprising: (a) a pump impeller comprising a pump impeller outer shell member, a pump impeller inner shell comprising a pump impeller outer shell member, a pump impeller inner shell member, and a plurality of pump impeller vanes extending between said pump impeller outer shell member and said pump impeller inner shell member and having edges which lead between said pump impeller outer shell member and said pump impeller inner shell member which define a pump impeller inlet and a pump impeller outlet; (b) a turbine member comprising a turbine member outer shell member, a turbine member inner shell member, and a plurality of turbine member vanes extending between said turbine member outer shell member and said turbine member inner shell member and having edges which lead between said turbine member outer shell member and said turbine member inner shell member which define a turbine member inlet and a turbine member outlet; (c) a stator member comprising a stator member outer shell member, a stator member inner shell member, and a plurality of stator member vanes extending between said stator member outer shell member and said stator member inner shell member and having edges which lead between said stator member outer shell member and said stator member inner shell member which define a stator member inlet and a stator member outlet; (d) said pump impeller, said turbine member, and said stator member being coaxially mounted so as to be rotatable with respect to one another about a common central axis; said pump impeller outlet being generally proximate to said turbine member inlet, said turbine member outlet being generally proximate to said stator member inlet, and said stator member outlet being generally proximate to said pump impeller inlet; (e) said pump impeller outer shell member, said turbine member outer shell member, and said stator member outer shell member generally cooperating to define an outer toroidal surface, and said pump impeller inner shell member, said turbine member inner shell member, and said stator member inner shell member generally cooperating to define an inner toroidal surface which is fitted within said outer toroidal surface; said outer and inner toroidal surfaces together generally defining a hollow toroidal hydraulic fluid circulation path for being filled with hydraulic fluid for transferring torque between said pump impeller and said turbine member; (f) the ratio between the thickness of a cross section of said outer toroidal surface taken in a plane including said central axis along the direction of said central axis, and the thickness of said section of said outer toroidal surface along the direction perpendicular to said central axis, being less than approximately 0.9; (g) the axial distance between the general axial position of said edges of said stator member vanes which define said stator member inlet and the axial position of the edge of said stator member inner shell member in the direction of said stator member inlet being substantially greater than zero, with said stator member vanes which define said stator member inlet extending more towards the direction of said turbine member outlet than does said edge of said stator member inner shell member in the direction of said stator member inlet.

According to such a structure, the stator member may be formed to have vanes which are thick enough in the axial direction of the stator member to perform the needed function of momentum conversion of the hydraulic fluid passing through the stator member towards the pump impeller, without any danger being caused of the flow of hydraulic fluid from out of the outlet of the turbine member into the inlet of the stator member tending to impinge against the edge of the inner shell of the stator member which is approximate to the outlet of the turbine member, because these stator member vanes extend out past said edge of the inner shell of the stator member proximate to the outlet of the turbine member, thus reaching deeper into the flow of hydraulic fluid passing out from said outlet of said turbine member than does said edge of said inner stator member shell.

Further, according to a particular aspect of the present invention, these and other objects are more particularly and concretely accomplished by such a fluid torque converter as described above, wherein the parts in the extreme direction of said stator member inner shell member of said stator member vanes proximate to said edges of said stator member vanes which define said stator member inlet are chamfered away.

According to such a chamfered structure, smooth and uniform hydraulic fluid circulation without turbulence is further promoted within the hollow toroidal hydraulic fluid circulation path defined by the pump impeller, the turbine member, and the stator member.

Further, according to a particular aspect of the present invention, these and other objects are more particularly and concretely accomplished by such a fluid torque converter as described above, wherein the axial position of the edge of said stator member inner shell member in the direction of said stator member inlet substantially coincides with the axial position of the edge of said turbine member inner shell member in the direction of said turbine member outlet, and wherein said general axial position of said edges of said stator member vanes which define said stator member inlet is displaced substantially in the direction of said turbine member, from said axial position of the edge of said turbine member inner shell member in the direction of said turbine member outlet.

According to such a structure, the inner toroidal surface of the hydraulic fluid flow path defined by said inner shell of said pump impeller, said inner shell of said turbine member, and said inner shell of said stator member is properly defined, while said edges of the vanes of the stator member in the direction of the outlet of the turbine member are enabled to project out sufficiently into the flow of hydraulic fluid passing out from said outlet of said turbine member for said vanes to perform their proper function of momentum conversion of said flow of hydraulic fluid which passes through the stator member from its inlet past its vanes to its outlet, while said edge of said inner stator member shell in the direction of said turbine member outlet does not project out substantially at all into said flow of hydraulic fluid passing out from said turbine member outlet, and thus does not substantially disturb said flow of hydraulic fluid at all.

Further, according to a particular aspect of the present invention, these and other objects are more particularly and concretely accomplished by a fluid torque converter of any one of the sorts described above, wherein said stator member is formed as an axially drawn type stator wheel which is produced by drawing two molds apart from one another along the axial direction of the stator member.

According to such a construction, a convenient type of manufacture may be utilized for the stator member, while not entailing any difficulties with regard to the above described problem of interference by the inner shell of said stator member with the flow of hydraulic fluid within the torque converter.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and prope scope of the appended claims. In the drawings:

DESCRIPTION OF THE PREFERRED EMBODIMENT

Figure 2:
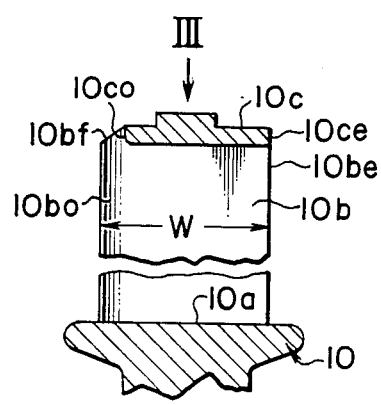
FIG. 2 is an enlarged side view of vanes of a stator member of the torque converter shown in FIG. 1, taken from the same angle as is the section of FIG. 1, and also showing parts of inner and outer shells of the stator member is sectional view.
Figure 3:
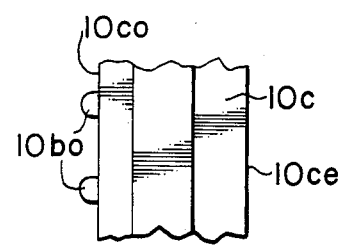
FIG. 3 is a view of said inner shell of the stator member shown in FIG. 2, and of the edges of said vanes thereof, as seen in the direction of the arrow III in FIG. 2.

The present invention will now be described with reference to the preferred embodiment thereof, and with reference to the appended drawings. In FIGS. 2 and 3, parts and dimensions of the preferred embodiment shown, which corresponds to parts and dimensions shown in FIG. 1, said parts having the same functions, are designated by the same reference numerals and symbols as in FIG. 1.

Figure 1:
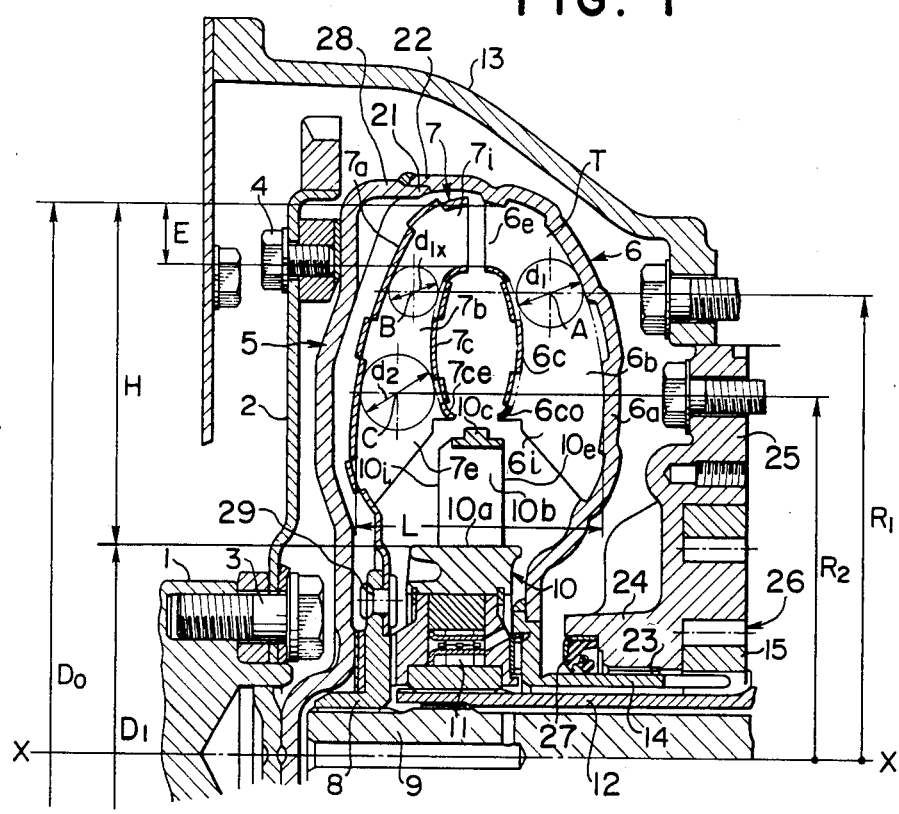
FIG. 1 is a sectional view through said preferred embodiment of the torque converter according to the present invention, showing the basic structure thereof, taken in a plane which includes the central rotational axis of said torque converter.

Referring to FIG. 1, the reference numeral 1 denotes a power input shaft of a torque converter which is constructed according to the constructional principles explained and claimed in the aforementioned U.S. Pat. No. 4,186,557, and which also is constructed according to the preferred embodiment of the present invention. The power input shaft 1 is only shown in partial broken form in the figure, and is in fact a rotary power output member such as a crankshaft of an internal combustion engine not shown in the drawings. The power input shaft 1 is adapted to rotate about the axial line shown in FIG. 1 by the symbols X—X. To the right hand end as seen in the figure of the power input shaft 1 there is connected a drive plate or flywheel 2 by a plurality of bolts 3, one only of which is shown in FIG. 1; and on the outer peripheral edge of this drive plate 2 there is formed a starter ring gear. By a plurality of bolts 4 (only one of which, again, is shown in FIG. 1) there is fixed to this drive plate 2 a torque converter housing front cover 5, which is formed as a generally dish shaped member with an outer peripheral axially extending flange 28 which extends to the right in FIG. 1 and which is formed with a narrowed engaging lip 21. Overlapping this engaging lip 21 of this outer peripheral axially extending flange 28 of the front cover 5 there is fitted an engaging lip 22 formed on the left hand circumferential edge of an outer shell 6a of a pump impeller 6, said pump impeller outer shell 6a being formed as a generally deep dish shaped member. Thus, the pump impeller 6 is rotationally coupled to the power input shaft 1, via the torque converter front cover 5, the bolts 4, the drive plate 2, and the bolts 3.

The pump-impeller 6 comprises this outer shell 6a and a plurality of vanes 6b formed on the inside of the outer shell 6a, and also comprises an inner shell 6c supported on the inner edges (i.e., the edges which are inner with respect to the toroidal form of the torque converter, remote from the outer shell 6a, as will hereinafter be explained) of these vanes 6b. The radially outer sides (i.e., the sides most remote from the axial line X—X) of the vanes 6b define a hydraulic fluid outlet 6e of the pump impeller 6, and the radially inner sides of the vanes 6b, i.e. the sides closest to the axial line X—X, define a hydraulic fluid inlet 6i of the pump impeller 6.

The radially inner part of the outer shell 6a of the pump impeller 6 is fixed to a hollow shaft 14, which is coaxial with the power input shaft 1, and which is freely rotatably supported, via a supporting structure 23 mounted around its outside surface which may be a needle roller bearing assembly or the like, by a hub portion 24 of a fixed torque converter rear member 25. The pump impeller 6 and the hollow shaft 14 are coaxial with the power input shaft 1, and are thus also rotatable around the axial line shown in FIG. 1 by the symbols X—X. The right hand end of the hollow shaft 14 in FIG. 1 is rotationally engaged to and drives an inner rotor member 15 of a hydraulic fluid pump assembly 26, which fills the inside of the torque converter assembly with hydraulic fluid in a per se well known fashion which will not hereinafter be further discussed. A seal assembly 27 is fitted between the outer surface of the hollow shaft 14 and the hub portion 24 of the fixed torque converter rear member 25, so as to prevent escape of hydraulic fluid from out of the inside of the torque converter assembly.

Through the central hollow portion of the hollow shaft 14 there passes a hollow sleeve member 12, the right hand end of which (not shown in the drawings) is fixed with respect to the torque converter rear member 25, and which extends leftwards in the figure to an intermediate position within the torque converter assembly, where it projects out of the left hand end of the hollow shaft 14, thus extending out somewhat to the left thereof in FIG. 1. On this projecting part of said fixed hollow sleeve member 12 there is rotatably mounted via a one way brake 11 a torque converter stator member 10. The stator member 10 and the fixed hollow sleeve member 12 are coaxial with the power input shaft 1 and the pump impeller 6, and the torque converter stator member 10 is thus also rotatable around the axial line shown in FIG. 1 by the symbols X—X.

The stator member 10 comprises an outer shell 10a and a plurality of vanes 10b formed on the inside of this outer shell 10a, and also comprises an inner shell 10c supported on the inner edges (i.e., the edges which are inner with respect to the toroidal form of the torque converter, but which in fact are radially outer, with respect to the axial line X—X) of these vanes 10b. The right sides in the figure of the vanes 10b define a hydraulic fluid outlet 10e of the stator member 10 which is adjacent to the hydraulic fluid inlet 6i of the pump impeller 6, and the left sides of the vanes 10b define a hydraulic fluid inlet 10i of the stator member 10.

Through the central hollow portion of the sleeve member 12 there passes a power outlet shaft 9, the right hand end of which in the sense of FIG. 1 extends outwards to the right of the torque converter assembly in order to provide an output of rotational power therefrom to a gear transmission mechanism of an automatic transmission which is not shown in the figures. The left hand end of this power output shaft 9 in FIG. 1 protrudes out from the left hand end of the sleeve member 12, inside the torque converter assembly. On this projecting left hand end of the power output shaft 9 there is mounted as rotationally connected thereto (for example, by splines or the like) a hub member 8, and to an outer peripheral flange portion of this hub member 8 there is fixedly attached by a plurality of studs 29 (only one of which can be seen in FIG. 1) a torque converter turbine member 7. The turbine member 7 and the power output shaft 9 are coaxial with the power input shaft 1 and the pump impeller 6 and the stator member 10, and thus are also rotatable around the axial line shown in FIG. 1 by the symbols X—X.

This turbine member 7, similarly to the pump impeller 6 and the stator member 10, comprises an outer shell 7a and a plurality of vanes 7b formed on the inside of this outer shell 7a, and also comprises an inner shell 7c supported on the inner edges (i.e., the edges which are inner with respect to the toroidal form of the torque converter) of these vanes 7b. The radially outer sides (i.e., the sides most remote from the axial line X—X) of the vanes 7b define a hydraulic fluid inlet 7i of the turbine member 7 which is adjacent to the hydraulic fluid outlet 6e of the pump impeller 6, and the radially inner sides of the vanes 7b, i.e. the sides which are closest to the axial line X—X, define a hydraulic fluid outlet 7e of the turbine member 7 which is adjacent to the hydraulic fluid inlet 10i of the stator member 10.

In a per se well known way, the pump impeller 6, the turbine member 7, and the stator member 10 provide a function of transmission of rotary power between the pump impeller 6 and the turbine member 7, when the torque converter housing (which comprises the torque converter housing front cover 5 and the outer shell 6a of the pump impeller 6) is filled with hydraulic fluid, by circulation of hydraulic fluid through and between their vanes 6b, 7b, and 10b, and 10b, in the general circulation fashion of a smoke ring, in the counterclockwise direction as seen in the section shown in FIG. 1. In more detail, the hydraulic fluid filling the torque converter housing, as the pump impeller 6 is rotated in its preferred rotational direction which is of course the preferred rotational direction of the internal combustion engine—not shown—coupled to the power input shaft 1, picks up torque from the pump impeller 6 by being impelled by the vanes 6b of, and passes out from the outlet 6e of the pump impeller 6 and into the inlet 7i of the turbine member 7, so as to impinge upon the vanes 7b of said turbine member 7. The hydraulic fluid thus imparts torque to these vanes 7b, this torque being transmitted from these vanes 7b to the power output shaft 9 via the hub member 8; and then this hydraulic fluid is expelled from the outlet 7e of the turbine member 7, from which it enters into the inlet 10i of the stator member 10. In the stator member 10, by impinging against the vanes 10b thereof, the direction of motion of the hydraulic fluid is changed in a per se well known way, and then the hydraulic fluid exits from the outlet 10e of the stator member 10, and enters into the inlet 6i of the pump impeller 6, to be again recirculated. Thus, the hydraulic fluid passes around a fluid circulation path whose outside surface is defined by the outer shells 6a, 7a, 7a, and 8a of respectively the pump impeller 6, the turbine member 7, and the stator member 10, and whose inner surface is defined by the inner shells 6c, 7c, and 10c of these members respectively, said fluid circulation path being generally hollow toroidal in shape.

The constructional principles which constitute the inventive concept of the aforementioned previous U.S. Pat. No. 4,186,557, with regard to the dimensions as shown in FIG. 1 of this hollow toroidal fluid circulation path defined by the outer and inner shells 6a and 6c of the pump impeller 6, the outer and inner shells 7a and 7c of the turbine member 7, and the outer and inner shells 10a and 10c of the stator member 10, are as follows. In FIG. 1, reference symbols are used as follows: $D_0$ represents the maximum diameter of the hollow torus, i.e. the diameter of the largest circle that can be drawn around the central axis X—X of the hollow torus on the outer surface thereof; $D_1$ represents the diameter of the smallest circle that can be drawn around the central axis X—X of the hollow torus on the outer surface thereof; H represents half the difference between $D_0$ and $D_1$, in other words the thickness of the hollow torus as seen in the radial direction thereof, i.e. perpendicularly to the axis X—X thereof; L represents the thickness of the hollow torus along the axial direction X—X thereof; A represents the area of a circle of diameter $D_0$; a represents the total cross sectional area of the hydraulic fluid outlet 6e of the pump impeller 6, which is the same as the total cross sectional area of the hydraulic fluid inlet 7he turbine member 7, both of these total cross sectional areas being as presented in the axial direction, i.e. taken all around the axis X—X; $d_1$ and $d_2$ are the diameters of circles fitted in between the outer and inner shells 6a and 6c of the pump impeller 6, in a plane which includes the central axis X—X, whose centers are respectively at distances $R_1$ and $R_2$ away from said central axis X—X;

and $d_1$ is the diameter of a circle fitted in between the outer and inner shells 7a and 7c of the turbine member 7, in a plane which includes the central axis X—X, whose center is at said distance $R_1$ away from said central axis X—X, i.e. at the same radial distance $R_1$ out from the central axis X—X of the torque converter as is said circle with diameter $d_1$ fitted in the pump impeller 6. In this shown preferred embodiment of the torque converter according to the present invention, according to the inventive concept of the aforementioned previous U.S. Pat. No. 4,186,557, the following constraints are substantially satisfied:

(1) L/H is between 0.67 and 0.87
(2) $D_1/D_0$ is between 0.33 and 0.4
(3) a/A is between 0.18 and 0.23
(4) for all $R_1$ and $R_2$, $R_1 \times d_1 = R_2 \times d_2$ and there exists a constant k between 0.65 and 0.95, such that:

(5) for all $R_1$, $R_1 \times d_{1x} = k \times R_1 \times d_1$

Thus, the sectional shape of this hollow toroidal hydraulic fluid flow path is roughly the space defined between two ellipses, whose major axes are perpendicular to said axial line X—X.

As partially explained above in the section of the present specification entitled "BACKGROUND OF THE INVENTION", the difficulty that has risen in the prior art, i.e. in the construction of torque converters that incorporate the principles of U.S. Pat. No. 4,186,557 but that do not incorporate the inventive concept of the present invention, has been that the flow of hydraulic fluid from out of the outlet 7e of the turbine member 7 into the inlet 10i of the stator member 10 has tended to impinge against the edge 10c of the inner shell 10c of the stator member 10 which is towards the outlet 7e of the turbine member 7, i.e. against the left hand edge of said inner shell 10c as seen in FIGS. 1 and 2. This problem is pronounced in the case of torque converters constructed according to the above mentioned constructional principles to a degree that provides serious inconvenience, because of the elliptical form of the cross section of such torque converters, i.e. because of the compressed form of such torque converters as opposed to the generally circular cross sectional shape of more conventional torque converters; and further this problem is even worse when the stator member 10 is formed as an axially drawn type stator wheel, which is produced by drawing two molds apart from one another along the axial direction of the stator member 10. Yet, if the stator member 10 should be formed as of an axially shorter dimension, in order to obviate this problem, then this stator wheel 10 would have vanes 10b which were too thin, i.e. of too small extent in the axial direction, to perform the needed function of momentum conversion of the hydraulic fluid passing through the stator member 10.

However, according to the particular inventive concept of the present invention, this edge 10co of the inner shell 10c of the stator member 10 towards the outlet 7e of the turbine member 7 is cut away, as can be seen in FIG. 1, and as can be more clearly seen in FIGS. 2 and 3. FIG. 2 shows the vanes 10b of the stator member 10 more clearly in profile view, and FIG. 3 shows them as seen from the top in FIGS. 1 and 2, i.e. from the direction of the inner shell 10c c of the stator member 10. In other words, the edges 10bo of the vanes 10b of the stator member 10 which define the inlet 10i thereof extend more to the left in FIGS. 1 and 2, than does the edge 10co of the inner shell 10c of the stator member 10 proximate to said inlet 10i thereof. As can be seen in FIG. 1, in fact, in the shown preferred embodiment, said edge 10co of the inner shell 10c of the stator member 10 proximate to said inlet 10i thereof is at substantially the same axial position, relative to the axis X—X, as in the edge 7ce of the inner shell 7c of the turbine member 7 proximate to said outlet 7e thereof; and the edge 10ce of the inner shell 10c of the stator member 10 proximate to the outlet 10e thereof is also at substantially the same axial position, relative to the axis X—X, as in the edge 6co of the inner shell 6c of the pump impeller 6 proximate to the inlet 6i thereof; and further said edge 10ce of the inner shell 10c of the stator member 10 proximate to said outlet 10e thereof substantially coincides in axial position with said edges 10e of the vanes 10b of the stator member 10 which define said outlet 10e thereof; and thus the inner toroidal surface of the hydraulic fluid flow path defined by said inner shell 6c of said pump impeller 6, said inner shell 7c of said turbine member 7, and said inner shell 10c of said stator member 10, is properly defined, while, however, according to the inventive concept of the present invention, the edges 10bo of the vanes 10b of the stator member 10 which define the inlet 10i thereof are located, in axial position relative to the central axis X—X of the torque converter, more towards the direction of the turbine member 7 (i.e. to the left in FIG. 1) than is said edge 10co of the inner shell 10c of the stator member 10 proximate to said inlet 10i thereof. Thus said edges 10bo of the vanes 10b are enabled to project out sufficiently into the flow of hydraulic fluid passing out from said outlet 7e of said turbine member 7 for said vanes 10b perform their proper function of momentum conversion of said flow of hydraulic fluid which passes through the stator member 10 from its inlet 10i past its vanes 10b to its outlet 10e, while said edge of said inner stator member shell does not project out substantially at all into said flow of hydraulic fluid passing out from said outlet 7e of said turbine member 7, and thus does not substantially disturb said flow of hydraulic fluid at all.

As a particular constructional specialization of the inventive concept of the present invention, the parts of said edges 10bo of the vanes 10b of the stator member 10 which define the inlet 10i thereof which are located farthest away from the central axis X—X of the torque converter are preferred to be slantingly cut away or chamfered, as shown in FIG. 2 by the reference symbol 10bf. This is again in order to promote smooth and uniform hydraulic fluid circulation without turbulence within the hollow toroidal hydraulic fluid circulation path defined by the pump impeller 6, the turbine member 7, and the stator member 10.

Thus according to such a construction, even when the stator member is formed as an axially drawn type stator wheel which is produced by drawing two molds apart from one another along the axial direction of the stator member, the stator member may be formed to have vanes which are thick enough in the axial direction of the stator member to perform the needed function of momentum conversion of the hydraulic fluid passing through the stator member towards the pump impeller, i.e. vanes which possess a sufficiently great value of axial dimension W as indicated in FIG. 2, without any danger being caused of the flow of hydraulic fluid from out of the outlet of the turbine member into the inlet of the stator member (especially the part of said hydraulic fluid flow which passes proximate to the inner shell of the turbine member) tending to impinge against the edge of the inner shell of the stator member which is proximate to the outlet of the turbine member.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. A fluid torque converter, comprising:
   (a) a pump impeller comprising a pump impeller outer shell member, a pump impeller inner shell member, and a plurality of pump impeller vanes extending between said pump impeller outer shell member and said pump impeller inner shell member and having edges which lead between said pump impeller outer shell member and said pump impeller inner shell member which define a pump inlet and a pump impeller outlet;
   (b) a turbine member comprising a turbine member outer shell member, a turbine member inner shell member, and a plurality of turbine member vanes extending between said turbine member outer shell member and said turbine member inner shell member and having edges which lead between said turbine member outer shell member and said turbine member inner shell member which define a turbine member inlet and a turbine member outlet;
   (c) a stator member comprising a stator member outer shell member, a stator member inner shell member, and a plurality of stator member vanes extending between said stator member outer shell member and said stator member inner shell member and having edges which lead between said stator member outer shell member and said stator member inner shell member which define a stator member inlet and a stator member outlet, said stator member vanes having substantially a constant width in the direction of the central axis of the fluid torque converter over the substantially whole length thereof extended between said stator member outer shell member and said stator member inner shell member;
   (d) said pump impeller, said turbine member, and said stator member being coaxially mounted so as to be rotatable with respect to one another about a common central axis; said pump impeller outlet being generally proximate to said stator member inlet, and said stator member outlet being generally proximate to said pump impeller inlet;
   (e) said pump impeller outer shell member, said turbine member outer shell member, and said stator member outer shell member generally cooperating to define an outer toroidal surface, and said pump impeller inner shell member, said turbine member inner shell member, and said stator member inner shell member generally cooperating to define an inner toroidal surface which is fitted within said outer toroidal surface; said outer and inner toroidal surfaces together generally defining a hollow toroidal hydraulic fluid circulation path for being filled with hydraulic fluid for transferring torque between said pump impeller and said turbine member;
   (f) the ratio between the thickness of a cross section of said outer toroidal surface taken in a plane including said central axis along the direction of said central axis, and the thickness of said section of said outer toroidal surface along the direction perpendicular to said central axis, being less than approximately 0.9;
   (g) an edge of said stator member inner shell member at said stator member inlet being substantially opposed to and aligned with an edge of said turbine member inner shell member at said turbine member outlet; and said edges of said stator member vanes which define said stator member inlet being substantially extended at portions thereof in the vicinity of said edge of said stator member inner shell member at said stator member inlet towards said turbine member outlet beyond said edge of said stator member inner shell member at said stator member inlet.

* * * * *